United States Patent Office 3,287,466
Patented Nov. 22, 1966

3,287,466
CERTAIN 3-ALKYL-4-IMINO-5-(ARYLIMINO)-2-THIAZOLIDINONE COMPOUNDS
Hein L. Klopping, Wilmington, Del., assignor to E. I. du Pont de Nemours and Company, Wilmington, Del., a corporation of Delaware
No Drawing. Filed Oct. 12, 1964, Ser. No. 403,373
9 Claims. (Cl. 260—306.7)

This invention relates to the herbicidal use of imino-thiazolidinones. More specifically, this invention relates to 4-imino-5-phenylimino-2-thiazolidinones of the following formula and to their use as herbicides:

(1) 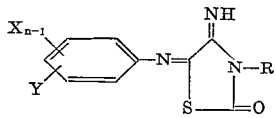

wherein

R is hydrogen, or alkyl of from one to 4 carbons;
X is halogen, and $n$ is a positive integer less than 3, namely 1 or 2; and Y is hydrogen, halogen, alkyl of from one to 4 carbon atoms, alkoxy of from one to 4 carbon atoms, $NO_2$, or $CF_3$.

I have discovered that the above-described compounds have outstanding herbicidal activity against a broad spectrum of weeds whether used pre-emergence, directed post-emergence, for weed control or for general vegetation control.

PREPARATION

The compounds of this invention can be prepared by first reacting a substituted phenylisothiocyanate with sodium or potassium cyanide to form a substituted 2-phenylimino-2-mercaptonitrile which is in turn reacted with an isocyanate in the presence of a suitable basic catalyst as indicated below.

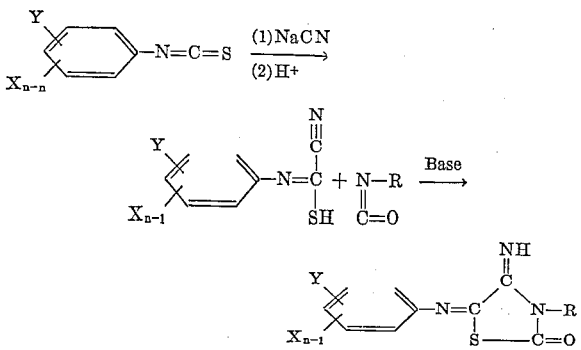

wherein

X, Y, R, and $n$ correspond to the same designations of Formula 1.

The preparation of these compounds is further illustrated in the examples.

COMPOSITIONS

Herbicidal compositions of the present invention can be prepared by admixing at least one of the compounds of Formula 1 with pest control adjuvants or modifiers to provide compositions in the form of dusts, granules, pellets, water-dispersible powders, high-strength concentrates, aqueous dispersions or emulsions and solutions or dispersions in organic liquids.

Thus, the compounds of Formula 1 can be used with a carrier or diluent agent such as a finely divided solid, an organic liquid, water, a wetting agent, a dispersing agent, an emulsifying agent, an aqueous emulsion or any suitable combination of these.

Compositions of the invention, especially liquids and wettable powders, contain as a conditioning agent one or more surface-active agents, sometimes called surfactants, in amounts sufficient to render a given composition containing the compounds of Formula 1 readily dispersible in water or in oil.

The surface-active agent used in this invention can be a wetting, dispersing or an emulsifying agent which will assist dispersion of the compound. The surface-active agent or surfactant can include such anionic, cationic and non-ionic agents as have heretofore been generally employed in plant control compositions of similar type. Suitable surface-active agents are set forth, for example, in "Detergents and Emulsifiers" 1964 Annual by John W. McCutcheon, Inc. and Bulletin E–607 of the Bureau of Entomology and Plant Quarantine of the U.S. Department of Agriculture.

In general, less than 10% by weight of the surface-active agent will be used in compositions of this invention and ordinarily the amount of surface-active agents will range from 1–5% but may even be less than 1% by weight.

Additional surface-active agents can be added to the formulations to increase the ratio of surfactant:active ingredient up to as high as 5:1 by weight. Such compositions have a greater herbicidal effectiveness than can be expected from a consideration of the activity of the components used separately. When used at higher rates it is prefered that the surfactant be present in the range of one-fifth to five parts surfactant for each one part of active agent.

WETTABLE POWDERS

Wettable powders are water-dispersible compositions containing the active material, an inert solid extender, and one or more surfactants to provide rapid wetting and prevent heavy flocculation when suspended in water.

The inert extenders which are preferred for use in the wettable powders of this invention containing the compounds of Formula 1 are of mineral origin.

The classes of extenders suitable for the wettable powder formulations of this invention are the natural clays, diatomaceous earth, and synthetic mineral fillers derived from silica and silicate. Most preferred fillers for this invention are kaolinites, attapulgite clay, montmorillonite clays, synthetic silicas, synthetic magnesium silicate and calcium sulfate dihydrate.

Suitable surfactants for use in such compositions are those listed by J. W. McCutcheon in "Detergents and Emulsifiers" 1964 Annual. Among the more preferred surfactants are the non-ionic and anionic type, and those most suitable for the preparation of the dry, wettable products of this invention are solid forms of compounds known to the art as wetters and dispersants. Occasionally a liquid, non-ionic compound classified primarily as an emulsifier may serve as both wetter and dispersant.

Most preferred wetting agents are alkylbenzene and alkylnaphthalene sulfonates, sulfated fatty alcohols, amines or acid amides, long chain acid esters of sodium isothionate, esters of sodium sulfosuccinate, sulfated or sulfonated fatty acid esters, petroleum sulfonates, sulfonated vegetable oils and ditertiary acetylenic glycols. Preferred dispersants are methyl cellulose, polyvinyl alcohol, sodium lignin sulfonates, polymeric alkylnaphthalene sulfonates, sodium naphthalene sulfonate, polymethylene bisnaphthalenesulfonate and sodium-N-methyl-N-(long chain acid) taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1.0 weight percent of the extender may be replaced by a corrosion inhibitor or an anti-foaming agent or both.

Thus, wettable powder formulations of the invention will contain from about 25 to 90 weight percent active material, from 0.5 to 2.0 weight percent wetting agent, from 0.25 to 5.0 weight percent dispersant, and from 9.25 to 74.25 weight percent inert extender, as these terms are described above.

When the wettable powder contains a corrosion inhibitor or an anti-foaming agent or both, the corrosion inhibitor will not exceed about 1 percent of the composition, and the anti-foaming agent will not exceed about 0.5 percent by weight of the composition, both replacing equivalent amounts of the inert extender.

HIGH-STRENGTH COMPOSITIONS AND AQUEOUS SUSPENSION CONCENTRATES

High-strength compositions generally consist of 90 to 99.5% active ingredient and 0.5 to 10% of a liquid or solid surfactant such as those described by McCutcheon in "Detergents and Emulsifiers" 1964 Annual. Such high-strength compositions can often be used in a manner similar to the wettable powders but they are also suitable for further formulation.

The aqueous suspension concentrates are prepared by mixing together and sandgrinding an aqueous slurry of water-insoluble active ingredient in the presence of dispersing agents. Thus there is obtained a concentrated slurry of very finely divided particles in which the active ingredient is substantially all below 5 microns in size. This concentrated aqueous suspension is characterized by its extremely small particle size so that upon diluting and spraying, a very uniform coverage is obtained.

These aqueous suspension concentrates will contain from 15 to 40% of active ingredient, from 45 to 70% water with the remainder made up of surfactants and corrosion inhibitors.

Suspensions in organic liquids can be prepared in a similar manner such as by replacing the water with mineral oil.

DUSTS

Dusts are dense powder compositions which are intended for application in dry form, in accordance with the preferred compositions and methods of the invention. Dusts are characterized by their free-flowing and rapid settling properties so that they are not readily windborne to areas where their presence is not desired. They contain primarily an active material and a dense, free-flowing, solid extender.

Their performance is sometimes aided by the inclusion of a wetting agent, and convenience in manufacture frequently demands the inclusion of an inert, absorptive grinding aid. For the dust compositions of this invention, the inert extender may be either of vegetable or mineral origin, the wetting agent is preferably anionic or non-ionic, and suitable absorptive grinding aids are of mineral origin.

Suitable classes of inert solid extenders for use in the dust compositions are those organic or inorganic powders which possess high bulk density and are very free-flowing. They are also characterized by possessing relatively low surface areas and are poor in liquid absorption. Suitable classes of grinding aids are natural clays, diatomaceous earths, and synthetic mineral fillers derived from silica or silicate. Among ionic and non-ionic wetting agents, the most suitable are the members of the group known to the art as wetting agents and emulsifiers. Although solid agents are preferred because of ease in incorporation some liquid non-ionic agents are also suitable in the dust formulations.

Preferred inert solid extenders for the dusts of this invention are micaceous talcs, pyrophyllite, dense kaolin clays, tobacco dust and ground calcium phosphate rock such as that known as "Phosphodust," a trademark of the American Agricultural Chemical Company.

Preferred grinding aids are attapulgite clay, diatomaceous silica, synthetic fine silica and synthetic calcium and magnesium silicates. Preferred wetting agents are those previously described under wettable powder formulations.

The inert solid extenders in the dusts of this invention are usually present in concentrations of from about 30 to 90 weight percent of the total composition. The grinding aid will usually constitute 5 to 50 weight percent of the composition, and the wetting agent will constitute from about 0 to 1.0 weight percent of the composition. Dust compositions can also contain other surfactants such as dispersing agents in concentrations of up to about 0.5 weight percent.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Thus, the dust compositions of this invention will comprise about 5 to 20 weight percent active material, 5 to 50 weight percent absorptive filler, 0 to 1.0 weight percent wetting agent, and about 30 to 90 weight percent dense, free-flowing dust diluent, as these terms are used herein. Such dust formulations can contain, in addition, minor amounts of dispersants, corrosion inhibitors, and anti-foam agents, derived from the wettable powders used to make the dusts.

EMULSIFIABLE OILS

Emulsifiable oils are usually solutions of active material in non-water miscible solvents together with a surfactant.

For the compounds of this invention, emulsifiable oils can be made by mixing the active ingredient with a solvent and surfactant. Suitable solvents for the compounds of this invention are aromatic hydrocarbons including many weed oils, chlorinated solvents, and non-water miscible ethers, esters, or ketones. Suitable surfactants are those anionic or non-ionic agents known to the art as emulsifying agents. Such compounds can be found listed in "Detergents and Emulsifiers" 1964 Annual by John W. McCutcheon, Inc.

Emulsifying agents most suitable for the emulsifiable oil compositions of this invention are alkyl aryl polyethoxy alcohols, alkyl and alkyl aryl polyether alcohols, polyoxyethylene sorbitol or sorbitan fatty acid esters, polyethylene glycol fatty esters, fatty alkylol amide condensates, amine salts of fatty alcohol sulfates plus long chain alcohols and oil soluble petroleum sulfonates. Such emulsifying agents will comprise from about 3 to 10 weight percent of the total composition. As described above, however, up to 5 parts of emulsifying agent for each part of 4-imino-5-phenyl-imino-2-thiazolidinone can be used.

Thus, emulsifiable oil compositions of the present invention will consist of from about 15 to 50 weight percent active material, about 40 to 82 weight percent solvent, and about 3 to 10 weight percent emulsifier, as these terms are defined and used above.

GRANULES AND PELLETS

Granules and pellets are physically stable, particulate compositions containing a compound of Formula 1 which adheres to or is distributed through a basic matrix of a coherent, inert carrier with macroscopic dimensions. In order to aid leaching of the active ingredient from the granule or pellet, a surfactant is usually present.

For the compounds of this invention, the inert carrier is preferably of mineral origin, and the surfactant is a compound known to the art as a wetting agent. Such compounds are listed by J. W. McCutcheon in "Detergents and Emulsifiers" 1964 Annual.

Suitable carriers are natural clays, some pyrophyllites and vermiculite. Suitable wetting agents are anionic or non-ionic.

For the granule compositions of this invention, most suitable carriers are of two types. The first are porous, absorptive, preformed granules, such as preformed and screened granular attapulgite or heat expanded, granular, screened vermiculite. On either of these, a solution of the active agent can be sprayed and will be absorbed at concentrations up to 25 weight percent of the total weight. The second, which are also suitable for pellets, are initially powdered kaolin clays, hydrated attapulgite, or bentonitic clays, either sodium, calcium, or magnesium bentonites. These are blended with the active components to give mixtures that are granulated or pelleted, followed by drying, to yield formulations with the active component distributed uniformly throughout the mass. Such granules and pellets can also be made with 25 to 30 weight percent active component, but more frequently a concentration of about 10 weight percent is desired for optimum distribution. The granular compositions of this invention are most useful in a size range of 15–30 mesh.

The most suitable wetting agents for the granular compositions of this invention depend upon the type of granule used. When preformed granules are sprayed with active material in liquid form, the most suitable wetting agents are non-ionic, liquid wetters miscible with the solvent. These are compounds more generally known to the art as emulsifiers, and comprise alkyl aryl polyether alcohols, alkyl polyether alcohols, polyoxyethylene sorbitol or sorbitan fatty acid esters, polyethylene glycol fatty esters, fatty alkylol amide condensates and oil soluble petroleum or vegetable oil sulfonates. Such agents will usually comprise up to about 5 weight percent of the total composition.

When the active ingredient is first mixed with a powdered carrier and subsequently granulated, or pelleted, liquid non-ionic wetters can still be used, but it is usually preferable to incorporate at the mixing stage one of the solid, powdered anionic wetting agents such as those previously listed for the wettable powders. Such agents will comprise from about 0 to 2 weight percent of the total composition.

Thus, the preferred granular or pelleted formulations of this invention comprise about 5 to 30 weight percent active material, about 0 to 5 weight percent wetting agent, and about 65 to 95 weight percent inert mineral carrier, as these terms are used herein.

APPLICATION

The method of controlling the growth of weeds in accordance with the present invention comprises applying a 4 - imino - 5 - phenylimino - 2 - thiazolidinone of Formula 1, ordinarily in a herbicidal composition such as those described above, to a locus or area to be protected from the undesirable plant growth. The active compound is applied in sufficient concentration to exert the desired herbicidal activity. The application can be made directly upon the locus or area and the vegetation thereon during the period of infestation. Representative of the weeds destroyed include the following: wild oats, wild mustard, crabgrass, barnyard grass, foxtail, Johnsongrass from seed, bindweed from seed, ryegrass, pigweed and chickweed.

The dosage employed can be determined readily by those skilled in the art by conventional techniques. It is dependent upon the particular active ingredient employed, the nature of the formulation used, the type of treatment, the type of vegetation to be controlled, climatic conditions and the like. In general, pre-emergence application of from ¼ lb. to 5 lb. per acre of active ingredient is effective for killing weeds, however, for reasons of convenience and economy, a preferred amount would be from about ½ lb. to about 3 lb. of active ingredient per acre. When the application is directed postemergence an amount of from about ½ lb. to about 4 lb. of active ingredient per acre is herbicidally effective. For general vegetation control, amounts of from 10 lb. to 50 lb. of active ingredient per acre are satisfactory.

In order that this invention can be better understood the following examples are given in which parts and percentages are by weight unless otherwise noted.

Example 1

A total of 76 parts by weight of 2-fluorophenylisothiocyanate contained in 200 parts by weight of 95% alcohol is stirred as 32.5 parts by weight of potassium cyanide contained in 300 parts by weight of water is gradually added. The temperature is maintained between 20–25° C. The reaction is stirred 3 more hours and let stand 12 additional hours at room temperature. Five hundred parts by weight of water is added, the solution filtered and the filtrate acidified with 45 parts by volume of concentrated hydrochloric acid. The product, 2-(2-fluorophenylamino)-2-mercaptoacetonitrile, is then obtained by filtration with a M.P. of 86–87.5° C.

The substituted 2-phenylimino-2-mercaptoacetonitriles used in Examples 2 through 90 are prepared by substituting equivalent amounts of the corresponding substituted phenylisothiocyanates for the 2-fluorophenylisothiocyanate of this example, and reacting it with sodium or potassium cyanide under similar conditions.

Example 2

A total of 27 parts by weight of 2-(2-fluorophenylimino)-2-mercaptoacetonitrile and 0.1 part by weight of anhydrous triethylamine contained in 300 parts by weight of dry benzene is stirred as 10 parts by weight of methylisocyanate is gradually added. The temperature is maintained between 25–30°. The reaction mixture is stirred further for 3 more hours at room temperature. The solution is filtered and the filtrate concentrated in vacuum to yield 5 - (2 - fluorophenylimino)-4-imino-3-methyl-2-thiazolidinone of a M.P. of 157° C.

Example 3.—5-(2-fluorophenylimino)-4-imino-2-thiazolidinone

A total of 18 parts by weight of 2-(2-fluorophenylimino)-2-mercaptoacetonitrile and 0.1 part by weight of anhydrous triethylamine contained in 100 parts by weight of anhydrous tetrahydrofuran is cooled to −10 to 0°. While still maintaining the temperature of the reaction between −10 to 0°, 4.3 parts by weight of isocyanic acid is slowly added. The solution is allowed to warm to room temperature gradually and then is stirred for an additional 3 hours. The mixture is filtered and the filtrate concentrated in vacuum to yield 5-(2-fluorophenylimino)-4-imino-2-thiazolidinone of a M.P. of 222–224° C.

Examples 4–81

The following products are prepared by substituting equivalent amounts of the following substituted 2-phenylimino-2-mercaptoacetonitriles and isocyanates for the 2-(2-fluorophenylimino)-2-mercaptoacetonitrile and methylisocyanate in Example 2.

| Example | Substituted 2-phenylimino-2-mercaptoacetonitrile | Isocyanate | Product |
|---|---|---|---|
| 4 | 2-(3,4-dichlorophenylimino)-2-mercaptoacetonitrile | Methylisocyanate | 5-(3,4-dichlorophenylimino)-4-imino-3-methyl-2-thiazolidinone. |
| 5 | 2-(4-chlorophenylimino)-2-mercaptoacetonitrile | do | 5-(4-chlorophenylimino)-4-imino-3-methyl-2-thiazolidinone. |
| 6 | do | Butylisocyanate | 5-(4-chlorophenylimino)-4-imino-3-butyl-2-thiazolidinone. |
| 7 | 2-(2-methyl-4-chlorophenylimino)-2-mercaptoacetonitrile. | Methylisocyanate | 5-(2-methyl-4-chlorophenylimino)-4-imino-3-methyl-2-thiazolidinone. |
| 8 | 2-(3-ethyl-4-chlorophenylimino)-2-mercaptoacetonitrile | do | 5-(3-ethyl-4-chlorophenylimino)-4-imino-3-methyl-2-thiazolidinone. |
| 9 | 2-phenylimino-2-mercaptoacetonitrile | do | 5-phenylimino-4-imino-3-methyl-2-thiazolidinone. |
| 10 | 2-(4-butylphenylimino)-2-mercaptoacetonitrile | do | 5-(4-butylphenylimino)-4-imino-3-methyl-2-thiazolidinone. |
| 11 | 2-(2,4,6-trichlorophenylimino)-2-mercaptoacetonitrile | do | 5-(2,4,6-trichlorophenylimino)-4-imino-3-methyl-2-thiazolidinone. |
| 12 | 2-(3-fluoro-4-chlorophenylimino)-2-mercaptoacetonitrile | Ethylisocyanate | 5-(3-fluoro-4-chlorophenylimino)-4-imino-3-ethyl-2-thiazolidinone. |
| 13 | 2-(2-methoxy-5-chlorophenylimino)-2-mercaptoacetonitrile. | Methylisocyanate | 5-(2-methoxy-5-chlorophenylimino)-4-imino-3-methyl-2-thiazolidinone. |
| 14 | 2-(4-methoxyphenylimino)-2-mercaptoacetonitrile | do | 5-(4-methoxyphenylimino)-4-imino-3-methyl-2-thiazolidinone. |
| 15 | 2-(4-isopropoxyphenylimino)-2-mercaptoacetonitrile | do | 5-(4-isopropoxyphenylimino)-4-imino-3-methyl-2-thiazolidinone. |
| 16 | 2-(2-nitro-4-chlorophenylimino)-2-mercaptoacetonitrile | do | 5-(2-nitro-4-chlorophenylimino)-4-imino-3-methyl-2-thiazolidinone. |
| 17 | 2-(3-trifluoromethyl-6-chlorophenylimino)-2-mercaptoacetonitrile. | do | 5-(3-trifluoromethyl-6-chlorophenylimino)-4-imino-3-methyl-2-thiazolidinone. |
| 18 | 2-(4-chlorophenylimino)-2-mercaptoacetonitrile | Ethylisocyanate | 5-(4-chlorophenylimino)-4-imino-3-ethyl-2-thiazolidinone. |
| 19 | 2-(3-trifluoromethylphenylimino)-2-mercaptoacetonitrile. | do | 5-(3-trifluoromethylphenylimino)-4-imino-3-ethyl-2-thiazolidinone. |
| 20 | 2-(4-iodophenylimino)-2-mercaptoacetonitrile | Methylisocyanate | 2-(4-iodophenylimino)-4-imino-3-methyl-2-thiazolidinone. |
| 21 | 2-(4-cumylimino)-2-mercaptoacetonitrile | do | 2-(4-cumylimino)-4-imino-3-methyl-2-thiazolidinone. |
| 22 | 2-(3-nitrophenylimino)-2-mercaptoacetonitrile | do | 5-(3-nitrophenylimino)-4-imino-3-methyl-2-thiazolidinone. |
| 23 | 2-(3-bromophenylimino)-2-mercaptoacetonitrile | do | 5-(3-bromophenylimino)-4-imino-3-methyl-2-thiazolidinone. |
| 24 | 2-(2-nitrophenylimino)-2-mercaptoacetonitrile | do | 5-(2-nitrophenylimino)-4-imino-3-methyl-2-thiazolidinone. |
| 25 | 2-(3-chlorophenylimino)-2-mercaptoacetonitrile | do | 5-(3-chlorophenylimino)-4-imino-3-methyl-2-thiazolidinone. |
| 26 | 2-(2-chlorophenylimino)-2-mercaptoacetonitrile | do | 5-(2-chlorophenylimino)-4-imino-3-methyl-2-thiazolidinone. |
| 27 | 2-(4-chlorophenylimino)-2-mercaptoacetonitrile | n-Propylisocyanate | 5-(4-chlorophenylimino)-4-imino-3-n-propyl-2-thiazolidinone. |
| 28 | 2-(3-bromophenylimino)-2-mercaptoacetonitrile | Methylisocyanate | 5-(3-bromophenylimino)-4-imino-3-methyl-2-thiazolidinone. |
| 29 | 2-(4-bromophenylimino)-2-mercaptoacetonitrile | do | 5-(4-bromophenylimino)-4-imino-3-methyl-2-thiazolidinone. |
| 30 | 2-(3-fluorophenylimino)-2-mercaptoacetonitrile | do | 5-(3-fluorophenylimino)-4-imino-3-methyl-2-thiazolidinone. |
| 31 | 2-(4-fluorophenylimino)-2-mercaptoacetonitrile | do | 5-(4-fluorophenylimino)-4-imino-3-methyl-2-thiazolidinone. |
| 32 | 2-(2,3-dichlorophenylimino)-2-mercaptoacetonitrile | do | 5-(2,3-dichlorophenylimino)-4-imino-3-methyl-2-thiazolidinone. |
| 33 | 2-(2,4-dichlorophenylimino)-2-mercaptoacetonitrile | do | 5-(2,4-dichlorophenylimino)-4-imino-3-methyl-2-thiazolidinone. |
| 34 | 2-(2,5-dichlorophenylimino)-2-mercaptoacetonitrile | do | 5-(2,5-dichlorophenylimino)-4-imino-3-methyl-2-thiazolidinone. |
| 35 | 2-(2,6-dichlorophenylimino)-2-mercaptoacetonitrile | do | 5-(2,6-dichlorophenylimino)-4-imino-3-methyl-2-thiazolidinone. |
| 36 | 2-(3,5-dichlorophenylimino)-2-mercaptoacetonitrile | do | 5-(3,5-dichlorophenylimino)-4-imino-3-methyl-2-thiazolidinone. |
| 37 | 2-(2,4-dibromophenylimino)-2-mercaptoacetonitrile | do | 5-(2,4-dibromophenylimino)-4-imino-3-methyl-2-thiazolidinone. |
| 38 | 2-(2,5-dibromophenylimino)-2-mercaptoacetonitrile | do | 5-(2,5-dibromophenylimino)-4-imino-3-methyl-2-thiazolidinone. |
| 39 | 2-(2,6-dibromophenylimino)-2-mercaptoacetonitrile | do | 5-(2,6-dibromophenylimino)-4-imino-3-methyl-2-thiazolidinone. |
| 40 | 2-(3,4-dibromophenylimino)-2-mercaptoacetonitrile | do | 5-(3,4-dibromophenylimino)-4-imino-3-methyl-2-thiazolidinone. |
| 41 | 2-(3,5-dibromophenylimino)-2-mercaptoacetonitrile | do | 5-(3,5-dibromophenylimino)-4-imino-3-methyl-2-thiazolidinone. |
| 42 | 2-(2,4-difluorophenylimino)-2-mercaptoacetonitrile | do | 5-(2,4-difluorophenylimino)-4-imino-3-methyl-2-thiazolidinone. |
| 43 | 2-(3,5-difluorophenylimino)-2-mercaptoacetonitrile | do | 5-(3,5-difluorophenylimino)-4-imino-3-methyl-2-thiazolidinone. |
| 44 | 2-(2,4,5-trichlorophenylimino)-2-mercaptoacetonitrile | do | 5-(2,4,5-trichlorophenylimino)-4-imino-3-methyl-2-thiazolidinone. |
| 45 | 2-(3-bromo-4-methoxyphenylimino)-2-mercaptoacetonitrile. | do | 5-(3-bromo-4-methoxyphenylimino)-4-imino-3-methyl-2-thiazolidinone. |
| 46 | 2-(2-fluorophenylimino)-2-mercaptoacetonitrile | Ethylisocyanate | 5-(2-fluorophenylimino)-4-imino-3-ethyl-2-thiazolidinone. |
| 47 | 2-(2,4-difluorophenylimino)-2-mercaptoacetonitrile | Butylisocyanate | 5-(2,4-difluorophenylimino)-4-imino-3-butyl-2-thiazolidinone. |
| 48 | 2-(2-fluorophenylimino)-2-mercaptoacetonitrile | Propylisocyanate | 5-(2-fluorophenylimino)-4-imino-3-propyl-2-thiazolidinone. |
| 49 | 2-(2-methyl-3-chlorophenylimino)-2-mercaptoacetonitrile. | Methylisocyanate | 5-(2-methyl-3-chlorophenylimino)-4-imino-3-methyl-2-thiazolidinone. |
| 50 | 2-(2-methyl-4-bromophenylimino)-2-mercaptoacetonitrile. | do | 5-(2-methyl-4-bromophenylimino)-4-imino-3-methyl-2-thiazolidinone. |
| 51 | 2-(2-methyl-4-fluorophenylimino)-2-mercaptoacetonitrile. | do | 5-(2-methyl-4-fluorophenylimino)-4-imino-3-methyl-2-thiazolidinone. |
| 52 | 2-(2-methyl-5-chlorophenylimino)-2-mercaptoacetonitrile. | do | 5-(2-methyl-5-chlorophenylimino)-4-imino-3-methyl-2-thiazolidinone. |
| 53 | 2-(3-methylphenylimino)-2-mercaptoacetonitrile | do | 5-(3-methylphenylimino)-4-imino-3-methyl-2-thiazolidinone. |
| 54 | 2-(4-methylphenylimino)-2-mercaptoacetonitrile | do | 5-(4-methylphenylimino)-4-imino-3-methyl-2-thiazolidinone. |
| 55 | 2-(2-methyl-5-fluorophenylimino)-2-mercaptoacetonitrile. | do | 5-(2-methyl-5-fluorophenylimino)-4-imino-3-methyl-2-thiazolidinone. |
| 56 | 2-(2-methyl-6-chlorophenylimino)-2-mercaptoacetonitrile. | do | 5-(2-methyl-6-chlorophenylimino)-4-imino-3-methyl-2-thiazolidinone. |
| 57 | 2-(3-methyl-4-fluorophenylimino)-2-mercaptoacetonitrile. | do | 5-(3-methyl-4-fluorophenylimino)-4-imino-3-methyl-2-thiazolidinone. |
| 58 | 2-(3-methyl-6-chlorophenylimino)-2-mercaptoacetonitrile. | do | 5-(3-methyl-6-chlorophenylimino)-4-imino-3-methyl-2-thiazolidinone. |

| Example | Substituted 2-phenylimino-2-mercaptoacetonitrile | Isocyanate | Product |
|---|---|---|---|
| 59 | 2-(2-bromo-4-methylphenylimino)-2-mercaptoacetonitrile. | do | 5-(2-bromo-4-methylphenylimino)-4-imino-3-methyl-2-thiazolidinone. |
| 60 | 2-(2-chloro-4-methylphenylimino)-2-mercaptoacetonitrile. | do | 5-(2-chloro-4-methylphenylimino)-4-imino-3-methyl-2-thiazolidinone. |
| 61 | 2-(4-sec.-butylphenylimino)-2-mercaptoacetonitrile. | do | 5-(4-sec.-butylphenylimino)-4-imino-3-methyl-2-thiazolidinone. |
| 62 | 2-(3-chloro-4-methylphenylimino)-2-mercaptoacetonitrile. | do | 5-(3-chloro-4-methylphenylimino)-4-imino-3-methyl-2-thiazolidinone. |
| 63 | 2-(3-chloro-4-methoxyphenylimino)-2-mercaptoacetonitrile. | do | 5-(3-chloro-4-methoxyphenylimino)-4-imino-3-methyl-2-thiazolidinone. |
| 64 | 2-(3-ethylphenylimino)-2-mercaptoacetonitrile. | do | 5-(3-ethylphenylimino)-4-imino-3-methyl-2-thiazolidinone. |
| 65 | 2-(2-ethylphenylimino)-2-mercaptoacetonitrile. | Isopropylisocyanate. | 5-(2-ethylphenylimino)-4-imino-3-isopropyl-2-thiazolidinone. |
| 66 | 2-(2-methoxyphenylimino)-2-mercaptoacetonitrile. | Methylisocyanate. | 2-(2-methoxyphenylimino)-4-imino-3-methyl-2-thiazolidinone. |
| 67 | 2-(3-methoxyphenylimino)-2-mercaptoacetonitrile. | do | 5-(3-methoxyphenylimino)-4-imino-3-methyl-2-thiazolidinone. |
| 68 | 2-(4-methoxyphenylimino)-2-mercaptoacetonitrile. | Ethylisocyanate. | 5-(4-methoxyphenylimino)-4-imino-3-ethyl-2-thiazolidinone. |
| 69 | 2-(3-fluoro-4-methoxyphenylimino)-2-mercaptoacetonitrile. | Methylisocyanate. | 5-(3-fluoro-4-methoxyphenylimino)-4-imino-3-methyl-2-thiazolidinone. |
| 70 | 2-(4-sec.-butoxyphenylimino)-2-mercaptoacetonitrile. | do | 5-(4-sec.-butoxyphenylimino)-4-imino-3-methyl-2-thiazolidinone. |
| 71 | 2-(2-trifluoromethylphenylimino)-2-mercaptoacetonitrile. | do | 5-(2-trifluoromethylphenylimino)-4-imino-3-methyl-2-thiazolidinone. |
| 72 | 2-(3-trifluoromethylphenylimino)-2-mercaptoacetonitrile. | do | 5-(3-trifluoromethylphenylimino)-4-imino-3-methyl-2-thiazolidinone. |
| 73 | 2-(4-trifluoromethylphenylimino)-2-mercaptoacetonitrile. | do | 5-(4-trifluoromethylphenylimino)-4-imino-3-methyl-2-thiazolidinone. |
| 74 | 2-(2-nitro-5-chlorophenylimino)-2-mercaptoacetonitrile. | do | 5-(2-nitro-5-chlorophenylimino)-4-imino-3-methyl-2-thiazolidinone. |
| 75 | 2-(3-nitro-4-chlorophenylimino)-2-mercaptoacetonitrile. | do | 5-(3-nitro-4-chlorophenylimino)-4-imino-3-methyl-2-thiazolidinone. |
| 76 | 2-(3-nitro-4-fluorophenylimino)-2-mercaptoacetonitrile. | do | 5-(3-nitro-4-fluorophenylimino)-4-imino-3-methyl-2-thiazolidinone. |
| 77 | 2-(2-chloro-4-nitrophenylimino)-2-mercaptoacetonitrile. | do | 5-(2-chloro-4-nitrophenylimino)-4-imino-3-methyl-2-thiazolidinone. |
| 78 | 2-(3-fluoro-4-chlorophenylimino)-2-mercaptoacetonitrile. | do | 5-(3-fluoro-4-chlorophenylimino)-4-imino-3-methyl-2-thiazolidinone. |
| 79 | 2-(3-fluoro-6-chlorophenylimino)-2-mercaptoacetonitrile. | do | 5-(3-fluoro-6-chlorophenylimino)-4-imino-3-methyl-2-thiazolidinone. |
| 80 | 2-(3-chloro-4-fluorophenylimino)-2-mercaptoacetonitrile. | do | 5-(3-chloro-4-fluorophenylimino)-4-imino-3-methyl-2-thiazolidinone. |
| 81 | 2-(2-fluoro-4-chlorophenylimino)-2-mercaptoacetonitrile. | do | 5-(2-fluoro-4-chlorophenylimino)-4-imino-3-methyl-2-thiazolidinone. |

*Examples 82–91*

The following products are prepared by substituting equivalent amounts of the following substituted 2-phenylimino-2-mercaptoacetonitriles and isocyanates for the 2-(2-fluorophenylimino)-2-mercaptoacetonitrile and isocyanic acid in Example 3.

Ex. 93.—5-(3,4-dichlorophenylimino)-4-imino-3-methyl-2-thiazolidinone

Ex. 94.—5 - (4 - chlorophenylimino)-4-imino-3-methyl-2-thiazolidinone

Ex. 95.—5-phenylimino-4-imino-3-methyl-2-thiazolidinone

Ex. 96.—5 - (3 - fluoro-4-chlorophenylimino)-4-imino-3-ethyl-2-thiazolidinone

| Example | Substituted 2-phenylimino-2-mercaptoacetonitrile | Isocyanate | Product |
|---|---|---|---|
| 82 | 2-(4-chlorophenylimino)-2-mercaptoacetonitrile. | Isocyanic acid. | 5-(4-chlorophenylimino)-4-imino-2-thiazolidinone. |
| 83 | 2-(3,4-dichlorophenylimino)-2-mercaptoacetonitrile. | do | 5-(3,4-dichlorophenylimino)-4-imino-2-thiazolidinone. |
| 84 | 2-phenylimino-2-mercaptoacetonitrile. | do | 5-phenylimino-4-imino-2-thiazolidinone. |
| 85 | 2-(2-nitrophenylimino)-2-mercaptoacetonitrile. | do | 5-(2-nitrophenylimino)-4-imino-2-thiazolidinone. |
| 86 | 2-(3-nitrophenylimino)-2-mercaptoacetonitrile. | do | 5-(3-nitrophenylimino)-4-imino-2-thiazolidinone. |
| 87 | 2-(3-trifluoromethyl-6-chlorophenylimino)-2-mercaptoacetonitrile. | do | 5-(3-trifluoromethyl-6-chlorophenylimino)-4-imino-2-thiazolidinone. |
| 88 | 2-(2-nitro-4-chlorophenylimino)-2-mercaptoacetonitrile. | do | 5-(2-nitro-4-chlorophenylimino)-4-imino-2-thiazolidinone. |
| 89 | 2-(2,4-dibromophenylimino)-2-mercaptoacetonitrile. | do | 5-(2,4-dibromophenylimino)-4-imino-2-thiazolidinone. |
| 90 | 2-(3-methylphenylimino)-2-mercaptoacetonitrile. | do | 5-(3-methylphenylimino)-4-imino-2-thiazolidinone. |
| 91 | 2-(4-methoxyphenylimino)-2-mercaptoacetonitrile. | do | 5-(4-methoxyphenylimino)-4-imino-2-thiazolidinone. |

*Example 92*

| | Percent |
|---|---|
| 5 - (o - fluorophenylimino) - 4 - imino-3-methyl-2-thiazolidinone | 80 |
| Attapulgite clay | 16 |
| Sodium and calcium lignin sulfonate | 2 |
| Sodium alkyl naphthalene sulfonate | 2 |

The above components are blended and micropulverized to an average particle size of less than 50 microns. This powder is extended with water and applied to a ratoon field of sugar cane at a rate of 3 pounds of active ingredient per acre. Good growth of sugar cane is noted while excellent control of barnyard grass, crabgrass, foxtail and pigweed is obtained.

*Examples 93–96*

The following compounds are formulated in like manner and amounts to the 5-(o-fluorophenylimino)-4-imino-3-methyl-2-thiazolidinone of Example 92 and exhibit similar herbicidal activity.

*Example 97*

| | Percent |
|---|---|
| 5 - (4 - methoxyphenylimino) - 4 - imino - 3-methyl-2-thiazolidinone | 50 |
| Montmorillonite clay | 44 |
| Finely divided synthetic silica | 2 |
| Calcium sulfate dihydrate | 2 |
| Methyl cellulose | 1 |
| Dioctyl sodium sulfosuccinate | 1 |

The above components are blended and micropulverized to an average particle size below 50 microns.

The formulation is extended with water and applied in such a manner that 8 ounces of formulation is sprayed over a 1000 square foot area of freshly placed fill in a dump area. The application results in excellent control of ragweed, pigweed and wild mustard and other noxious weeds which create health hazards in dump areas.

*Examples 98–101*

The following compounds are formulated in like manner and amounts to the 5-(4-methoxyphenylimino)-4- imino-3-methyl-2-thiazolidinone of Example 97. Upon application the formulations exhibit comparable herbicidal activity to that shown in Example 97.

Ex. 98.—5-(4-chlorophenylimino)-4-imino-3-ethyl-2-thiazolidinone
Ex. 99.—5 - (3 - trifluoromethylphenylimino)-4-imino-3-ethyl-2-thiazolidinone
Ex. 100.—2-(4-iodophenylimino)-4-imino-3-methyl-2-thiazolidinone
Ex. 101.—2 - (4 - cumylimino)-4-imino-3-methyl-2-thiazolidinone

*Example 102*

| | Percent |
|---|---|
| 5 - (3 - bromophenylimino) - 4 - imino - 3 - methyl-2-thiazolidinone | 99 |
| Trimethylnonyl polyethyleneglycol ether | 1 |

The above components are blended and micropulverized to an average particle size smaller than 100 mesh. This concentrate is applied at a rate of 13.5 pounds of active material in 20 gallons of water to 1 mile of freshly disked fire lane 8 feet wide in a forest. The application results in excellent control of crabgrass, pigweed, foxtail and chickweed for one season. Repeated annual applications keep the fire lane clear and weed-free.

*Examples 103–105*

The following compounds are formulated in like manner and amounts to the 5-(3-bromophenylimino)-4-imino-3-methyl-2-thiazolidinone of Example 102. Upon application the formulations exhibit similar herbicidal activity to that shown in Example 102.

Ex. 103.—5-(3-nitrophenylimino)-4-imino-3-methyl-2-thiazolidinone
Ex. 104.—5-(2-nitrophenylimino)-4-imino-3-methyl-2-thiazolidinone
Ex. 105.—5 - (3-chlorophenylimino)-4-imino-3-methyl-2-thiazolidinone

*Example 106*

| | Percent |
|---|---|
| 5 - (3 - bromophenylimino) - 4 - imino - 3 - methyl-2-thiazolidinone | 30 |
| Calcium magnesium lignin sulfonate | 15 |
| Hydrated attapulgite | 2 |
| Sodium carbonate | 1 |
| Water | 52 |

The above solid components are ground to pass a 30-mesh screen. The water is then added and the suspension sandground to an average particle size of less than 5 microns.

The formulation is then suspended in water at a concentration of 40 pounds in 100 gallons and applied evenly over a measured acre of land which has been freshly prepared for building oil storage tanks. The application results in control of vegetation in the cleared area after the storage tanks are built. Repeated annual application keeps the area relatively free of weeds.

*Examples 107–108*

The following compounds are formulated in like amounts and similar manner to the 5-(3-bromophenylimino)-4-imino-3-methyl-2-thiazolidinone of Example 106 and upon application they exhibit similar herbicidal properties.

Ex. 107.—5-(3-fluorophenylimino)-4-imino-3-methyl-2-thiazolidinone
Ex. 108.—5-(4-chlorophenylimino)-4-imino-3-n-propyl-2-thiazolidinone

*Example 109*

| | Percent |
|---|---|
| Composition of Example 92 | 5.0 |
| Granular attapulgite (15–30 mesh) | 95.0 |

The formulation of Example 92 is slurried in 5 parts of water per part of formulation and the slurry is sprayed on the granular attapulgite which is tumbled in a blender. After spraying is complete the granules are dried and the above composition is obtained.

The granules are spread over the surface of a weed infested swamp area at a rate of 250 pounds of granules per acre. The application repeated twice annually provides control of such weeds as swamp smartweed, arrowweed, and rush.

*Example 110*

| | Percent |
|---|---|
| 5-(p-chlorophenylimino)-4-imino-3-methyl-2-thiazolidinone | 10 |
| Calcium, magnesium lignin sulfonate | 10 |
| Sodium alkyl naphthalene sulfonate | 2 |
| Kaolinite | 34 |
| Sodium sulfate, anhydrous | 10 |
| Sub-bentonite | 34 |

The above ingredients are blended and micropulverized to a particle size essentially below 100 microns. One half of this mixture is moistened with water and moist granulated to form granules which are dried and sieved prior to use. The remaining half of the above composition is moistened with 18% water, extruded through a 3/16" die, and cut into pellets which are then dried and are ready for use.

These pellets and granules when applied in a similar manner to that of Example 109 exhibit similar herbicidal activity.

*Examples 111–113*

The following compounds are substituted for the 5(p-chlorophenylimino)-4-imino-3-methyl-2-thiazolidinone of Example 110 and are formulated as in Example 110. Upon application they demonstrate similar herbicidal activity.

Ex. 111.—5-(3-fluorophenylimino)-4-imino-3-methyl-2-thiazolidinone
Ex. 112.—5-(3,4-dibromophenylimino)-4-imino-3-methyl-2-thiazolidinone
Ex. 113.—5-(4-methylphenylimino)-4-imino-3-methyl-2-thiazolidinone

*Example 114*

| | Percent |
|---|---|
| 5-(3-bromo-4-methoxyphenylimino)-4-imino-3-methyl-2-thiazolidinone | 20 |
| Isophorone | 72 |
| Nonylphenol polyethylene glycol ether | 5 |
| Calcium alkylbenzene sulfonate | 3 |

The above components are blended in a mixer until a homogeneous solution is obtained. This composition is then emulsified in water in such proportions that there are 50 pounds in the active ingredient in 250 gallons of water. This emulsion is sprayed on a parking lot which has been prepared for paving, at a rate of ½ gallon per 100 square feet. This application prevents the growth of weeds through cracks in the subsequently applied paving for an extended period of time.

*Example 115*

| | Percent |
|---|---|
| 5-(4-sec.-butylphenylimino)-4-imino-3-methyl-2-thiazolidinone | 15 |
| Heavy aromatic naphtha | 85 |

The above components are stirred in a mixer until a homogeneous solution is obtained.

Fifty pounds of the solution is dissolved in 120 gallons of Lion Herbicidal Oil No. 6. The solution is sprayed on one acre of area infested with weeds around a lumber storage area. The treatment results in a kill of weeds thereby providing protection against fire hazards.

Example 116

| | Percent |
|---|---|
| 5-(3,4-dichlorophenylimino)-4-imino-3-methyl-2-thiazolidinone | 30 |
| Polyoxyethylene sorbitol hexa-oleate | 10 |
| Paraffinic hydrocarbon oil | 60 |

The above herbicidal component is ground to pass a 30-mesh screen, the liquid components are then added and the mix is sandground to an average particle size of less than 5 microns.

The dispersion is extended with water so that a 1% emulsion of the active ingredient is formed. The emulsion is sprayed on vegetation growing around telephone poles and highway signposts until the foliage is thoroughly wet. The treatment results in kill of the vegetation thus eliminating the need for hand trimming.

Examples 117-118

The following compounds are substituted for the 5-(3,4-dichlorophenylimino) - 4-imino-3-methyl-2-thiazolidinone and are formulated in a like manner. Upon application they exhibit similar herbicidal activity.

Ex. 117.—5-(3-chloro-4-fluorophenylimino)-4-imino-3-methyl-2-thiazolidinone

Ex. 118.—5-(3,4-dichlorophenylimino)-4-imino-2-thiazolidinone

Example 119

The composition of Example 116 is tank mixed and extended with diesel oil instead of water so that ten pounds active ingredient is contained in 100 gallons of diesel oil. The mixture is sprayed along roadsides for the control of crabgrass, foxtail, and ragweed. This treatment gives excellent control of vegetation encroaching upon the edges of the roadway.

Example 120

| | Percent |
|---|---|
| 5-(m-bromophenylimino)-4-imino-3-methyl-2-thiazolidinone | 80 |
| Attapulgite clay | 16 |
| Sodium and calcium lignin sulfonate | 2 |
| Sodium alkyl naphthalene sulfonate | 2 |

The above components are blended and micropulverized to a particle size below 50 microns.

The wettable powder is extended with water in such a manner that 2 pounds per acre are applied pre-emergence in 60 gallons of water to a field planted to cotton. The application results in excellent control of crabgrass, pigweed, wild mustard and chickweed.

I claim:
1. The compounds of the following formula:

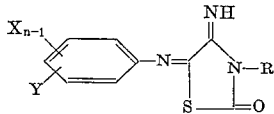

wherein
R is selected from the group consisting of hydrogen, and alkyl of one through four carbon atoms; X is halogen, and $n$ is a positive integer less than 3; and Y is selected from the group consisting of hydrogen, halogens, alkyl of 1 through 4 carbon atoms, alkoxy of 1 through 4 carbon atoms, trifluoromethyl and nitro.

2. 5 - (2 - fluorophenylimino)-4-imino-3-methyl-2-thiazolidinone.

3. 5 - (4 - chlorophenylimino)-4-imino-3-methyl-2-thiazolidinone.

4. 5 - (3,4 - dichlorophenylimino)-4-imino-3-methyl-2-thiazolidinone.

5. 5-phenylimino-4-imino-3-methyl-2-thiazolidinone.

6. 5 - (3 - fluoro - 4 - chlorophenylimino)-4-imino-3-methyl-2-thiazolidinone.

7. 5 - (3 - bromophenylimino)-4-imino-3-methyl-2-thiazolidinone.

8. 5 - (4 - chlorophenylimino)-4-imino-3-ethyl-2-thiazolidinone.

9. 5 - (3 - trifluoromethylphenylimino)-4-imino-3-ethyl-2-thiazolidinone.

References Cited by the Examiner

UNITED STATES PATENTS

| 2,837,529 | 6/1958 | Winthrop | 260—306.7 |
| 2,856,277 | 10/1958 | Bluestone | 71—2.5 |
| 2,860,962 | 11/1958 | Bluestone | 71—2.5 |
| 3,053,847 | 9/1962 | Schicke | 260—306.7 |

ALEX MAZEL, *Primary Examiner.*

A. D. ROLLINS, *Assistant Examiner.*